United States Patent
Wei et al.

(10) Patent No.: US 7,420,331 B2
(45) Date of Patent: Sep. 2, 2008

(54) DOPED DYSPROSIA DISCHARGE VESSEL

(75) Inventors: George C. Wei, Weston, MA (US); Walter P. Lapatovich, Boxford, MA (US); Joanne M. Browne, Newburyport, MA (US); Kailash C. Mishra, North Chelmsford, MA (US); Madis Raukas, Charlestown, MA (US)

(73) Assignee: Osram Sylvania Inc., Danvers, MA (US)

( * ) Notice: Subject to any disclaimer, the term of this patent is extended or adjusted under 35 U.S.C. 154(b) by 496 days.

(21) Appl. No.: 11/160,452

(22) Filed: Jun. 24, 2005

(65) Prior Publication Data

US 2005/0212435 A1    Sep. 29, 2005

(51) Int. Cl.
*H01J 17/16* (2006.01)
*H01J 61/30* (2006.01)
*C04B 35/50* (2006.01)
*G02B 5/20* (2006.01)
*G02B 5/23* (2006.01)

(52) U.S. Cl. .................. 313/636; 501/152; 252/584; 252/586

(58) Field of Classification Search .......... 313/636; 252/582, 584, 586, 588; 501/152, 905
See application file for complete search history.

(56) References Cited

U.S. PATENT DOCUMENTS

| 5,936,351 | A | 8/1999 | Lang ................. 313/634 |
| 6,215,254 | B1 | 4/2001 | Honda et al. ......... 315/246 |
| 6,294,871 | B1 | 9/2001 | Scott et al. .......... 313/636 |
| 6,300,264 | B1 * | 10/2001 | Ohara ................. 501/64 |
| 6,921,730 | B2 * | 7/2005 | Atagi et al. ........... 501/64 |
| 2002/0032118 | A1 | 3/2002 | Oshio | |

FOREIGN PATENT DOCUMENTS

| EP | 0 935 278 A1 | 8/1999 |
| EP | 0 587 238 B1 | 7/2000 |
| EP | 1 336 596 A1 | 8/2003 |
| EP | 0 926 106 B1 | 7/2004 |
| JP | 10-188893 | 7/1998 |
| JP | 11-147757 | 6/1999 |
| WO | WO 2004/055858 | 7/2004 |

OTHER PUBLICATIONS

I. Barin, *Thermochemical Data of Pure Substances*, VCH (Weinheim, Germany 1993) pp. 39, 48, 513-514, 1309, 1314, 1577-1578, 1674-1675.

S. Taniguchi et al., Energy Transfer from $Ce^{3+}$ to $Dy^{3+}$ in $Ca_3(PO_4)_2$ Ceramics, *J. Mater. Sci. Lett.*, 12 [5] (1993) 268-270.

(Continued)

*Primary Examiner*—Nimeshkumar D. Patel
*Assistant Examiner*—Anne M Hines
(74) *Attorney, Agent, or Firm*—Robert F. Clark

(57) ABSTRACT

A ceramic discharge vessel is provided wherein the vessel comprises a hollow body for enclosing a discharge and the hollow body is made of a polycrystalline dysprosium oxide containing a luminescent dopant that emits one or more visible light wavelengths when stimulated by radiation generated by the discharge. Preferably, the polycrystalline dysprosium oxide has been doped with one or more of europium, cerium, or terbium in an amount from about 0.1 to about 10 percent by weight on an oxide basis.

13 Claims, 4 Drawing Sheets

OTHER PUBLICATIONS

L. Shtenke et al., Luminescent Determination of Terbium in Dysprosium Oxide, *Zavod. Lab.*, 44 [4] (1978) 394-395.

L. Ma et al., Sensitised Luminescence and Energy Transfer of Tb3+ ion in Phosphate Glass, *J. Chin. Ceram. Soc.*, 25 [1] (1997) 1-5.

* cited by examiner

DOPED DYSPROSIA DISCHARGE VESSEL

BACKGROUND OF THE INVENTION

Metal halide discharge lamps have been favored for their high efficacies and high color rendering properties which result from the complex emission spectra generated by their rare-earth chemistries. Particularly desirable are ceramic metal halide lamps which offer improved color rendering, color temperature, and efficacy over traditional quartz arc tube types. This is because ceramic materials can operate at higher temperatures than quartz and are less prone to react with the various metal halide chemistries. The preferred ceramic material has been polycrystalline alumina (PCA).

Various shapes have been proposed for ceramic discharge vessels ranging from a right circular cylindrical shape to an approximately spherical (bulgy) shape. Examples of these types of arc discharge vessels are given in European Patent Application No. 0 587 238 A1 and U.S. Pat. No. 5,936,351, respectively. The bulgy shape with its hemispherical ends is preferred because it yields a more uniform temperature distribution, resulting in reduced corrosion of the discharge vessel by the metal halide fill materials.

SUMMARY OF THE INVENTION

Polycrystalline dysprosium oxide (dysprosia), $Dy_2O_3$, may also be used as a material for making ceramic discharge vessels for metal halide lamps. Unlike PCA, polycrystalline dysprosia has a cubic structure and therefore has the ability to make transparent discharge vessels for lighting applications requiring high optical throughput and consequently high-luminance sources. Polycrystalline dysprosia also has several intrinsic absorption bands in the range of 275-475 nm which are not present in PCA. As a result, the body color of the discharge vessel is slightly yellow compared to the whitish PCA vessels. The strong blue and UV absorption of the polycrystalline dysprosia filters the short-wavelength radiation emitted by the arc discharge and reduces the color temperature of the light generated by the lamp. For example, a conventional 3000 K metal halide chemistry will produce a color temperature of approximately 2500 K when used in a polycrystalline dysprosia discharge vessel.

It has been discovered that the strongly absorbed ultraviolet radiation may be converted into visible light by doping polycrystalline dysprosia with one or more of rare-earth metals such as cerium, terbium, and europium. Other luminescent dopants may include praseodymium, neodymium, samarium, erbium, ytterbium, holmium and thulium. Non-rare-earth metals such as Mn, Cr, Ti, V, Co, Ni, Cu, Bi, Pb, Sn and Sb represent additional possible luminescent dopants.

This introduces the possibility for adjusting the spectrum of the metal halide lamp without having to adjust the chemistry of the complex metal halide fill. For example, cerium ($Ce^{3+}$) may be used to enhance the yellow emission, terbium ($Tb^{3+}$) to enhance the green, and europium ($Eu^{3+}$) to add more red. The added visible emissions from the body of the discharge vessel should also enhance the efficacy of the lamp since more of the radiation emitted by the arc discharge is converted into visible light. Supplemental emission from the discharge vessel would have the effect of an extended mantle around the arc core similar to the emission from the orange sodium mantle observed in quartz metal halide lamps. In addition, the reduced UV output would ameliorate the need for the UV-absorbing shroud that is usually placed around the discharge vessel to protect people against over-exposure to UV radiation.

DETAILED DESCRIPTION OF THE INVENTION

For a better understanding of the present invention, together with other and further objects, advantages and capabilities thereof, reference is made to the following disclosure and appended claims taken in conjunction with the above-described drawings.

Figure 1:
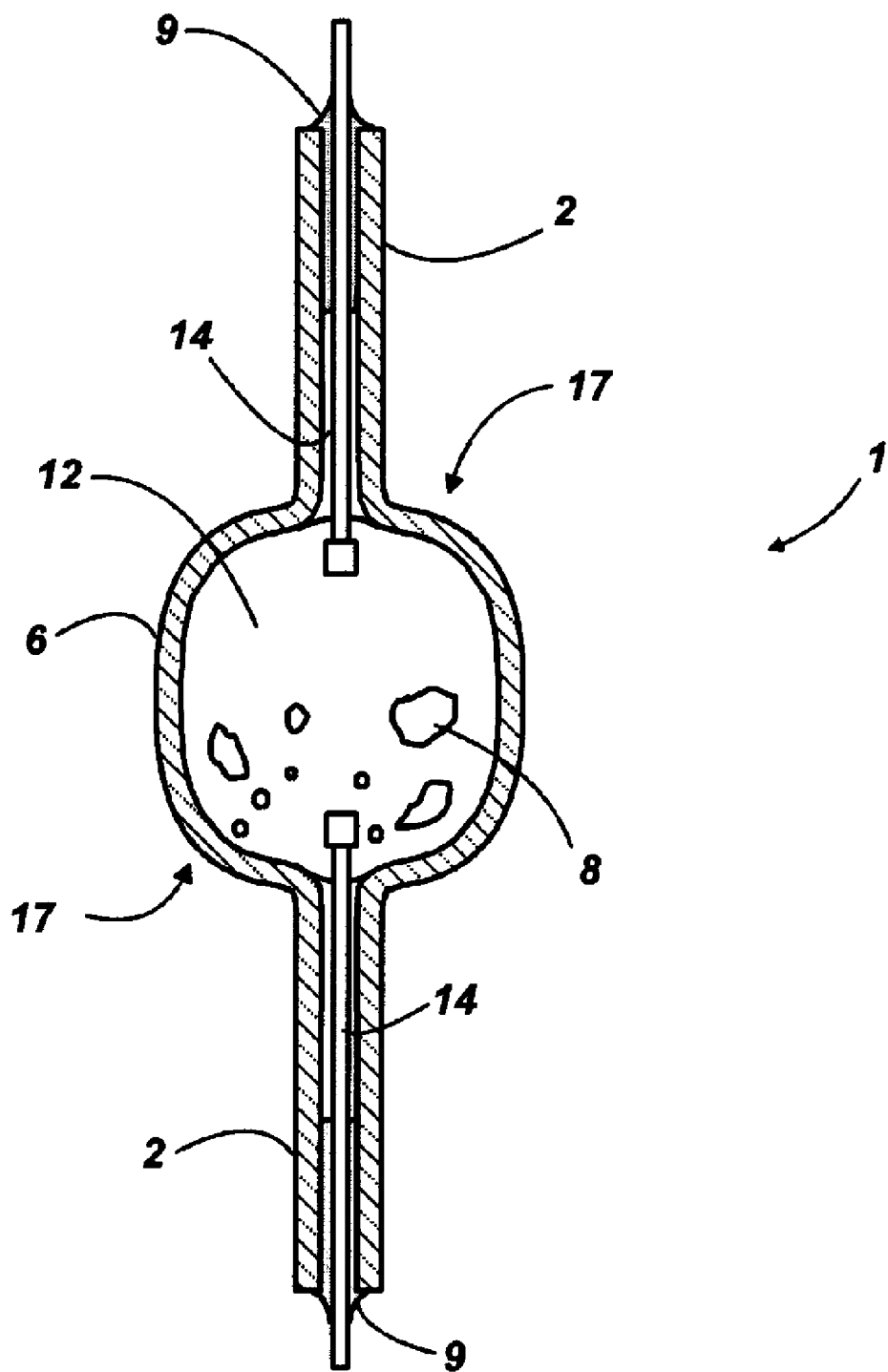
FIG. 1 is a cross-sectional illustration of a ceramic metal halide discharge vessel according to this invention.

Referring now to FIG. 1, there is shown a cross-sectional illustration of a discharge vessel for a metal halide lamp. The discharge vessel 1 is bulgy-shaped with hemispherical end wells 17. The bulgy-shaped vessel has a hollow, axially symmetric body 6 which encloses a discharge chamber 12. According to this invention, the body of the discharge vessel is comprised of polycrystalline dysprosium oxide that has been doped with one or more elements preferably selected from cerium, terbium, and europium. The amount of the dopant in the dysprosia body preferably may range from about 0.1 to about 10 percent by weight and is more preferably about 1 weight percent (wt. %) based on an oxide of the metal.

Two opposed capillary tubes 2 extend outwardly from the body 6 along a central axis. The capillary tubes in this embodiment have been integrally molded with the arc tube body. The discharge chamber 12 of the arc tube contains a buffer gas, e.g., 30 torr to 20 bar Xe, Kr, Ar, or mixtures thereof, and a metal halide fill 8, e.g., mercury plus a mixture of metal halide salts, e.g., NaI, $CaI_2$, $DyI_3$, $HoI_3$, $TmI_3$, and TlI, or metallic mercury alone at a sufficient quantity to achieve 200 bar pressure during operation.

Electrodes assemblies 14 are sealed to capillaries 2. In a preferred structure, the electrode assemblies are constructed of a niobium feedthrough, a tungsten electrode, and a molybdenum coil that is wound around a molybdenum or Mo—$Al_2O_3$ cermet rod that is welded between the tungsten electrode and niobium feedthrough. A tungsten coil or other suitable means of forming a point of attachment for the arc may be affixed to the end of the tungsten electrode. The frit material 9 creates a hermetic seal between the electrode assembly 14 and capillary 2. In metal halide lamps, it is usually desirable to minimize the penetration of the frit material into the capillary to prevent an adverse reaction with the corrosive metal halide fill.

While excitation via internally disposed electrodes is preferred, other configurations are also possible. For example, the excitation may be externally applied by capacitive electrodes, microwave cavities, or induction methods wherein an electrodeless lamp is realized. In fact, these configurations may be more desirable when using more aggressive fills that could attack the electrode structures, e.g., in the case of chloride salts.

EXAMPLES

Figure 2:
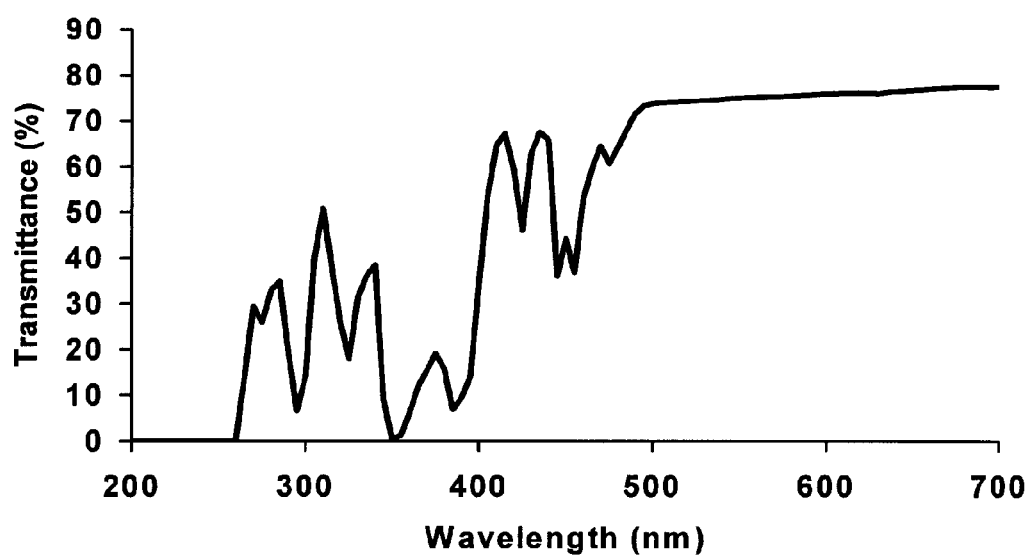
FIG. 2 is a graph of the in-line transmittance of a polished polycrystalline dysprosia disk.

The in-line transmittance of a polished polycrystalline dysprosium disk is shown in FIG. 2. The strong UV and blue absorption of the polycrystalline dysprosia is indicated by the low transmittance values from 200 to about 475 nm.

Figure 3:
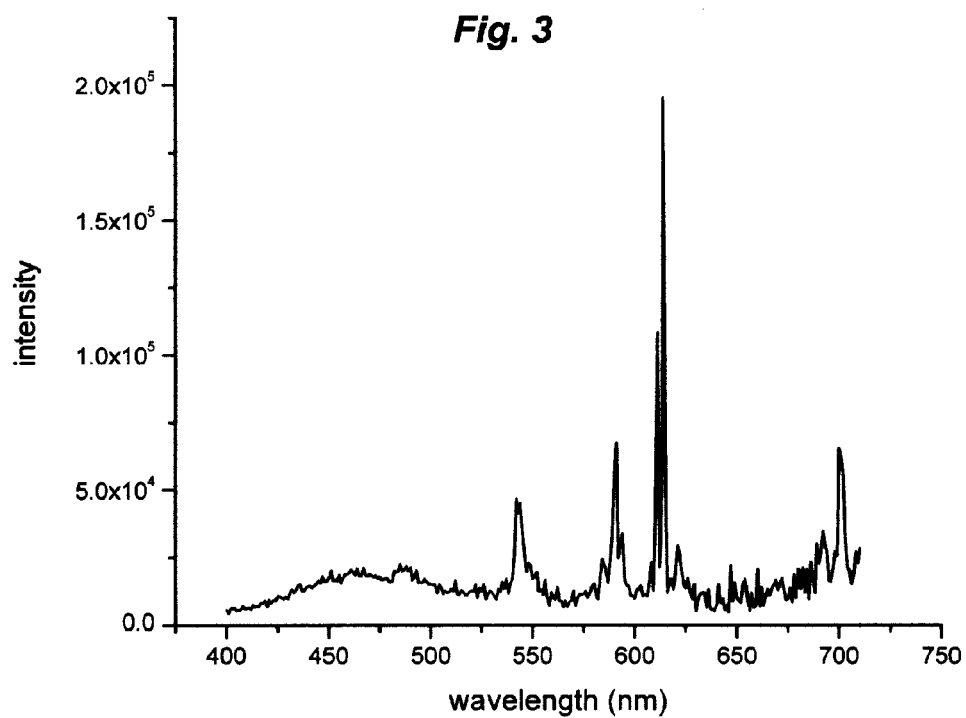
FIG. 3 is an emission spectrum for polycrystalline dysprosia doped with 1 wt. % $Eu_2O_3$. The excitation source was 270 nm ultraviolet radiation.
Figure 4:
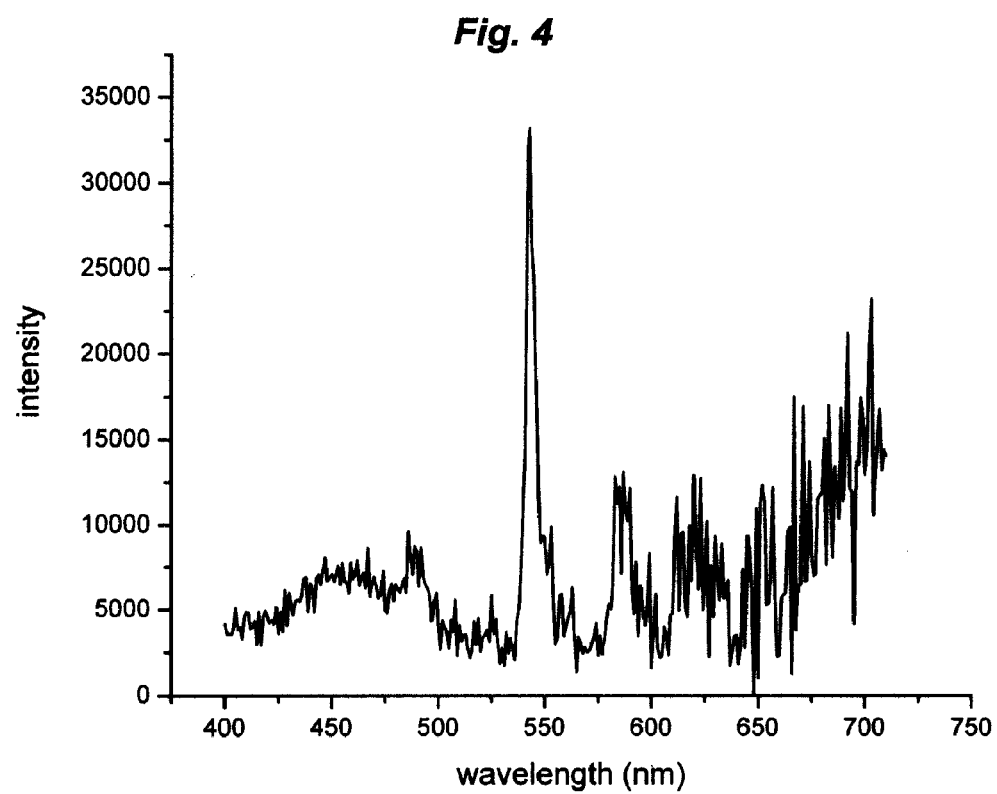
FIG. 4 is an emission spectrum for polycrystalline dysprosia doped with 1 wt. % $Tb_2O_3$. The excitation source was 270 nm ultraviolet radiation.
Figure 5:
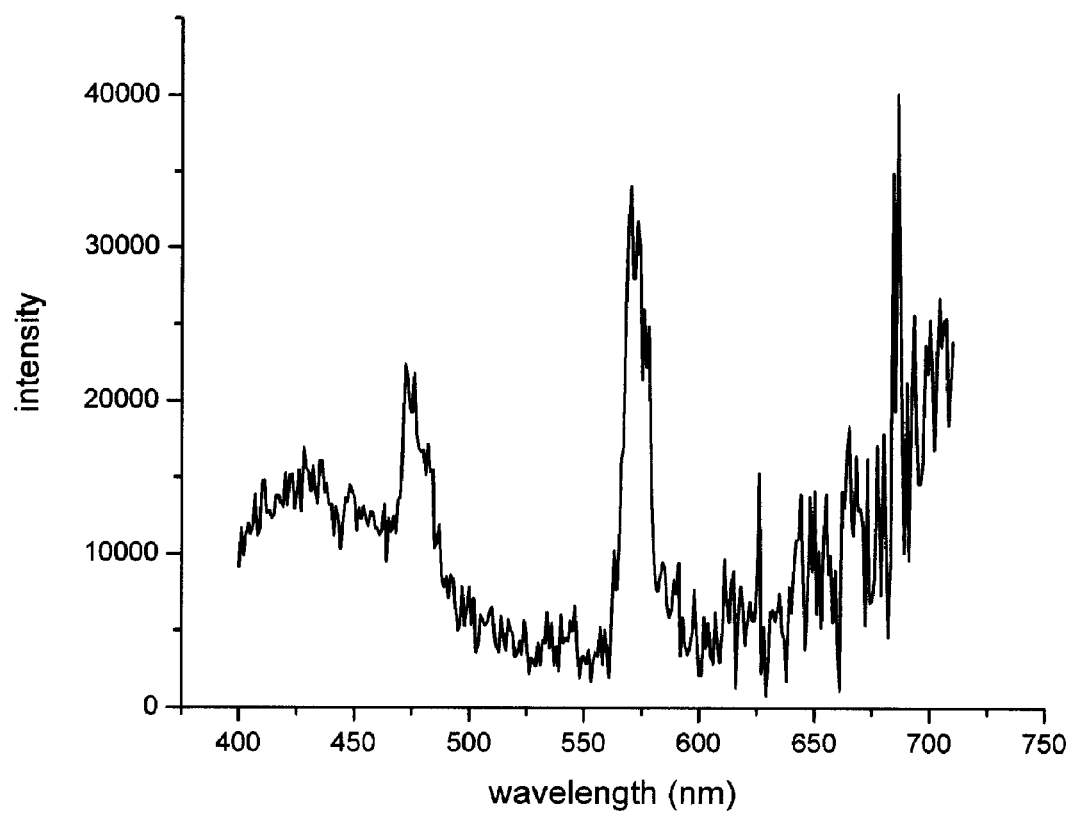
FIG. 5 is an emission spectrum for polycrystalline dysprosia doped with 1 wt. % $Ce_2O_3$. The excitation source was 270 nm ultraviolet radiation.

Polycrystalline dysprosium oxide disks were made with 1 wt. % $Eu_2O_3$, 1 wt. % $Tb_2O_3$ and 1 wt. % $Ce_2O_3$, respectively. The disks (~10 mm in diameter by 1.3 mm thick) were exposed to ultraviolet radiation (270 nm) and the visible emissions were measured. The emission spectra for the three disks are shown in FIGS. 3-5. Each of the disks emitted at least one emission peak in the visible wavelength region from 400 nm to 700 nm. The disk containing 1 wt. % $Eu_2O_3$ exhibited a characteristic red $Eu^{3+}$ emission at about 614 nm (FIG. 3); the disk containing 1 wt. % $Tb_2O_3$ exhibited a characteristic green $Tb^{3+}$ emission peak at about 545 nm (FIG. 4); and the disk containing 1 wt. % $Ce_2O_3$ exhibited a yellow $Ce^{3+}$ emission at about 573 nm (FIG. 5). Of the three, the disk containing 1 wt. % $Eu_2O_3$ exhibited the most intense emission. This is particularly useful for metal halide lamps since it is frequently necessary adjust the metal halide fill chemistry in order to increase the lamp's red emission in order to obtain a higher specific, R9, color rendering index.

These results demonstrate that a polycrystalline dysprosia discharge vessel that has been doped with luminescent ions may be used to adjust the emission spectrum of a metal halide lamp by enhancing different portions of the spectrum. This imparts an increased flexibility into the lamp design since the lamp spectrum may be varied according to the concentration and type of ion (or combination of ions) that is doped into the ceramic material.

While there have been shown and described what are presently considered to be the preferred embodiments of the invention, it will be apparent to those skilled in the art that various changes and modifications can be made herein without departing from the scope of the invention as defined by the appended claims.

What is claimed is:

1. A ceramic discharge vessel comprising a hollow body for enclosing a discharge, the hollow body consisting essentially of a polycrystalline dysprosium oxide having a luminescent dopant that emits one or more visible light wavelengths when stimulated by radiation generated by the discharge.

2. The discharge vessel of claim 1 wherein the visible emission from the luminescent dopant is a red emission.

3. The discharge vessel of claim 2 wherein the red emission from the luminescent dopant increases the R9 color rendering index value for light emitted from the discharge vessel.

4. The discharge vessel of claim 1 wherein the visible emission from the luminescent dopant is a green emission.

5. The discharge vessel of claim 1 wherein the visible emission from the luminescent dopant is a yellow emission.

6. A ceramic discharge vessel comprising a hollow body for enclosing a discharge, the hollow body consisting essentially of polycrystalline dysprosium oxide that has been doped with one or more metals selected from Ce, Tb, Eu, Pr, Nd, Sm, Er, Yb, Ho, Tm, Mn, Cr, Ti, V, Co, Ni, Cu, Bi, Pb, Sn, and Sb, or compounds thereof.

7. The ceramic discharge vessel of claim 6 wherein the polycrystalline dysprosium oxide contains from about 0.1 to about 10 percent by weight of the metal based on an oxide of the metal.

8. The ceramic discharge vessel of claim 6 wherein the polycrystalline dysprosium oxide contains about 1 percent by weight of the metal based on an oxide of the metal.

9. The ceramic discharge vessel of claim 6 wherein the polycrystalline dysprosium oxide has been doped with one or more of Ce, Tb, Eu, Pr, Nd, Sm, Er, Yb, Ho, and Tm.

10. The ceramic discharge vessel of claim 9 wherein the polycrystalline dysprosium oxide contains from about 0.1 to about 10 percent by weight of the metal based on an oxide of the metal.

11. A ceramic discharge vessel comprising a hollow body for enclosing a discharge, the hollow body consisting essentially of polycrystalline dysprosium oxide that has been doped with one or more metals selected from europium, cerium and terbium, or compounds thereof.

12. The ceramic discharge vessel of claim 11 wherein the polycrystalline dysprosium oxide contains from about 0.1 to about 10 percent by weight of the metal based on an oxide of the metal.

13. The ceramic discharge vessel of claim 12 wherein the polycrystalline dysprosium oxide contains about 1 percent by weight of the metal based on an oxide of the metal.

* * * * *